United States Patent
Haberkorn et al.

(10) Patent No.: US 10,487,195 B2
(45) Date of Patent: Nov. 26, 2019

(54) IMPROVING THE ROLLING RESISTANCE OF DIENE RUBBER TIRES BY MEANS OF SILANE-MODIFIED POLYBUTADIENES

(71) Applicant: Evonik Degussa GmbH, Essen (DE)

(72) Inventors: Niko Haberkorn, Dorsten (DE); Caren Röben, Essen (DE); Kai-Steffen Krannig, Dortmund (DE); André Wehmeier, Köln (DE); Andreas Berlineanu, Marl (DE); Christine Beierlein, Gelsenkirchen (DE); Patrick Glöckner, Haltern am See (DE); Dominik Maschke, Brühl (DE); Ralph Moser, Jersey City, NJ (US)

(73) Assignee: Evonik Degussa GmbH, Essen (DE)

( * ) Notice: Subject to any disclaimer, the term of this patent is extended or adjusted under 35 U.S.C. 154(b) by 184 days.

(21) Appl. No.: 15/569,264

(22) PCT Filed: Apr. 29, 2016

(86) PCT No.: PCT/EP2016/059594
§ 371 (c)(1),
(2) Date: Oct. 25, 2017

(87) PCT Pub. No.: WO2016/180649
PCT Pub. Date: Nov. 17, 2016

(65) Prior Publication Data
US 2018/0118926 A1 May 3, 2018

(30) Foreign Application Priority Data
May 13, 2015 (EP) .................................... 15167620

(51) Int. Cl.
| | | |
|---|---|---|
| C08L 9/00 | (2006.01) | |
| C08C 19/25 | (2006.01) | |
| C08L 7/00 | (2006.01) | |
| B60C 1/00 | (2006.01) | |
| F16C 1/26 | (2006.01) | |
| F16G 1/06 | (2006.01) | |

(52) U.S. Cl.
CPC .............. *C08L 9/00* (2013.01); *C08C 19/25* (2013.01); *C08L 7/00* (2013.01); *B60C 1/0016* (2013.01); *C08L 2205/025* (2013.01); *F16C 1/26* (2013.01); *F16G 1/06* (2013.01)

(58) Field of Classification Search
None
See application file for complete search history.

(56) References Cited

U.S. PATENT DOCUMENTS

| | | | |
|---|---|---|---|
| 3,929,850 A † | 12/1975 | Streck | |
| 5,066,721 A † | 11/1991 | Hamada | |
| 5,708,053 A † | 1/1998 | Jalics | |
| 7,411,018 B2* | 8/2008 | Appel | B60C 1/0016 524/318 |
| 9,080,042 B2* | 7/2015 | Pavon Sierra | B29D 29/00 |
| 9,708,518 B2* | 7/2017 | Zhang | C09J 109/00 |
| 2011/0146877 A1† | 6/2011 | Tanaka | |
| 2014/0121316 A1* | 5/2014 | Monsallier | C08K 3/36 524/526 |
| 2015/0307640 A1 | 10/2015 | Berlineanu et al. | |
| 2016/0311949 A1 | 10/2016 | Haberkorn et al. | |
| 2017/0174956 A1 | 6/2017 | Ramon-Gimenez et al. | |
| 2018/0118926 A1* | 5/2018 | Haberkorn | B60C 1/00 |

FOREIGN PATENT DOCUMENTS

| | | |
|---|---|---|
| EP | 1479698 A1 | 11/2004 |
| EP | 2266819 A1 | 12/2010 |
| EP | 2679605 A1 | 1/2014 |
| EP | 2818505 A1 | 12/2014 |
| JP | 2008031244 | 2/2008 |
| JP | 2015083649 | 4/2015 |
| JP | 2015083649 A * | 4/2015 |

OTHER PUBLICATIONS

Low Molar Mass Polvbutadiene made crosslinkable by the introduction of silane moieties via urethane linkage: 1. Synthesis and kinetic study, Schapman et al., Polymer vol. 39 No. 4 pp. 965-971, 1998 (Year: 1998).*

Functional Liquid Polymers, Idemitsu,Kosan Co. Ltd, R-45 HT product data (Year: 2019).*

Haag et al., "Functionalized Polybutadiene Oils as Adhesion Promotors for Mineral Fillers in Rubber Compounds," pp. 1-19, Die Angewandte Makromolekulare Chemie (171, Nr. 2826) Huthig & Wepf Verlag (21 pages).

Pradel et al., "Oligomeres hydroxytelecheliques de butadiene PBHT," translated "Hydroxyl-terminated butadiene oligomers HTPBs", pp. 1-11 plus cover page & 2 supplemental pages, Oct. 10, 2001, Materiaux/Plastiques et composites, Techniques De L'ingenieur (28 pages).

Schapman et al., "Low molar mass polybutadiene made crosslinkable by the introduction of silane moities via urethane linkage: 1. Synthesis and kinetic study", pp. 965-971, 1998, Polymer (vol. 39, No. 4) Elsevier Science Ltd. (7 pages).

(Continued)

*Primary Examiner* — Peter A Salamon
(74) *Attorney, Agent, or Firm* — Philip P. McCann; Nexsen Pruet PLLC

(57) ABSTRACT

The invention relates to the use of silane-modified polybutadienes in rubber mixtures, in particular for improving the rolling resistance of diene rubber tires. In particular, the invention is directed to silane-modified polybutadienes in rubber mixtures, wherein the polybutadiene comprises the 1,3-butadiene-derived monomer units and wherein the proportion of A in the entirety of the 1,3-butadiene-derived monomer units present in the polybutadiene is from 10 to 60 mol %, and wherein the sum of the proportions of B and C in the entirety of the 1,3-butadiene-derived monomer units present in the polybutadiene is from 40 to 90 mol %.

20 Claims, No Drawings

(56) References Cited

OTHER PUBLICATIONS

German language International Search Report dated Jun. 30, 2016 in PCT/EP2016/059594 (4 pages).
German language Written Opinion dated Jun. 30, 2016 in PCT/EP2016/059594 (5 pages).
International Search Report dated Jun. 30, 2016 in PCT/EP2016/059594 (3 pages).
Horst-Gunther Haag et al., "Functionalized Polybutadiene Oils as Adhesion Promotoers for Mineral Fillers in Rubber Compounds", pp. 1-19, Die Angewandte Makromolekulare Chemie (171, Nr. 2826) Huthig & Wepf Verlag.†
F. Schapman et al., "Low molar mass polybutadiene made crosslinkable by the introduction of silane moities via urethane linkage: 1. Synthesis and kinetic study", pp. 965-971, 1998, Polymer (vol. 39, No. 4) Elsevier Science Ltd.†
Jean-Laurent Pradel et al., "Oligomeres hydroxytelecheliques de butadiene PBHT", translated "Hydroxyl-terminated butadiene oligomers HTPBs", pp. 1-11 plus cover page & 2 supplemental pages, Oct. 10, 2001, Materiaux/Plastiques et composites, Techniques De L'ingenieur.†

\* cited by examiner
† cited by third party

IMPROVING THE ROLLING RESISTANCE OF DIENE RUBBER TIRES BY MEANS OF SILANE-MODIFIED POLYBUTADIENES

This application is a national stage application under 35 U.S.C. § 371 of International Application No. PCT/EP2016/059594 filed 29 Apr. 2016, which claims priority to EP Application No. 15167620.2 filed 13 May 2015, the disclosures of which are expressly incorporated herein by reference.

FIELD

The invention relates to the use of silane-modified polybutadienes in rubber mixtures, in particular for improving the rolling resistance of diene rubber tires.

BACKGROUND

Green tires are a trend in the automobile industry. The main objective is reducing rolling resistance, and thus fuel consumption, and also wet skidding while keeping abrasion constant. Addition of precipitated silicas to the formulations can achieve this objective but the silicas employed exhibit poor compatibility with the rubber matrix. This problem is currently ameliorated by addition of silanes as compatibilizers. Covalent bonding between the filler and the polymer brings the abrasion level of silica-filled tires in line with that of carbon black-filled tires.

Thus, JP 2008-031244 discloses a tire tread rubber composition composed of at least either a natural rubber or a synthetic rubber and a filler component composed exclusively of silicas or of silicas and carbon black, wherein the silica is composed of at least amorphous spherical silicon dioxide microparticles having an average particle diameter in the range from 0.05 to 1.00 µm. JP 2015083649, US 2014/0121316 or EP 2266819 describe the functionalization of anionically polymerized polybutadienes. EP 1479698 describes the functionalization of polybutadienes having a vinyl content below 2%.

EP 2818505 proposes a rubber mixture where diene rubbers are reacted with acrylamides and/or with silane- or tin-modified acrylamides. The production of the systems described in the prior art is highly complex.

SUMMARY

There is accordingly a need for improved rubber mixtures obtainable in simple fashion and exhibiting improved abrasion properties.

In the context of the present invention it can be shown that, surprisingly to a person skilled in the art, the use of silane-modified polybutadienes with specific microstructure in rubber mixtures results in tires having improved properties.

DETAILED DESCRIPTION

Accordingly, the invention firstly provides for the use of silane-modified, in particular silane-terminated, polybutadienes in rubber mixtures, wherein the polybutadiene comprises the 1,3-butadiene-derived monomer units

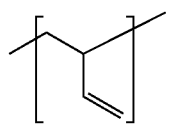
(A)

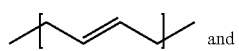
and
(B)

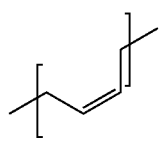
(C)

and wherein the proportion of A in the entirety of the 1,3-butadiene-derived monomer units present in the polybutadiene is from 10 to 60 mol %, and wherein the sum of the proportions of B and C in the entirety of the 1,3-butadiene-derived monomer units present in the polybutadiene is from 40 to 90 mol %.

The advantage of the silane-modified polybutadienes employed in accordance with the invention is that energy dissipation, for example rolling resistance, and DIN abrasion are improved.

The silane-modified polybutadiene employed in accordance with the invention is obtained by reacting hydroxyl-terminated polybutadienes produced by free-radical polymerization with one or more organosilane compounds which allow bonding to the terminal hydroxyl groups of the polybutadiene.

In the context of the present invention the hydroxyl-terminated polybutadiene produced by free-radical polymerization already comprises the 1,3-butadiene-derived monomer units

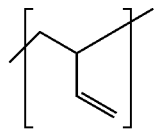
(A)

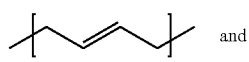
and
(B)

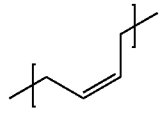
(C)

wherein the proportion of A in the entirety of the 1,3-butadiene-derived monomer units present in the polybutadiene is from 10 to 60 mol %, and wherein the sum of the proportions of B and C in the entirety of the 1,3-butadiene-derived monomer units present in the polybutadiene is from 40 to 90 mol %.

The abovementioned hydroxyl-terminated polybutadiene is a polybutadiene having hydroxyl groups produced by free-radical polymerization of 1,3-butadiene, in each case comprising the 1,3-butadiene-derived monomer units A), B) and C) present in the polybutadiene, wherein a square bracket in the formula representation used in this application for the 1,3-butadiene-derived monomer units A), B) and C) present in the polybutadiene indicates that the bond marked with the respective square bracket is not terminated with, for instance, a methyl group but that this bond instead bonds the relevant monomer unit to another monomer unit or a hydroxyl group. These monomer units A), B) and C) may be arranged in the polymer in any desired sequence. A random arrangement is preferred.

In a preferred embodiment, the proportion of A), B) and C) in the entirety of the 1,3-butadiene-derived monomer units present in the polybutadiene is in each case and independently of one another at least 10 mol %.

It is especially preferable when the proportion of A) in the entirety of the 1,3-butadiene-derived monomer units present in the polybutadiene is from 15 to 30 mol %, the proportion of B) in the entirety of the 1,3-butadiene-derived monomer units present in the polybutadiene is from 50 to 70 mol % and the proportion of C) in the entirety of the 1,3-butadiene-derived monomer units present in the polybutadiene is from 15 to 30 mol %. The average molecular weight, determined by gel permeation chromatography, of the hydroxyl-terminated polybutadienes is typically between 1000 and 10,000 g/mol, preferably 1500-5000 g/mol, particularly preferably 1500-3500 g/mol.

In a further embodiment, in addition to the 1,3-butadiene-derived monomer units A), B) and C) present in the polybutadiene, other monomer units, in particular those not derived from 1,3-butadiene, may also be present. However, in a most preferred embodiment the entirety of the 1,3-butadiene-derived monomer units A), B) and C) present in the polybutadiene represents a proportion of the entirety of the monomer units incorporated in the polymer and comprising the 1,3-butadiene-derived units and other units of at least 80, preferably 90, more preferably 95 and most preferably 100 mol %.

The silane-modified polybutadienes employed in accordance with the invention are produced, as specified above, by a process comprising the steps of:
a) providing a polybutadiene produced by free-radical polymerization and having hydroxyl groups, preferably terminal hydroxyl groups,
b) reacting the polybutadiene having hydroxyl groups from step a) with one or more organosilane compounds.

The polybutadiene having terminal hydroxyl groups comprises the 1,3-butadiene-derived monomer units,

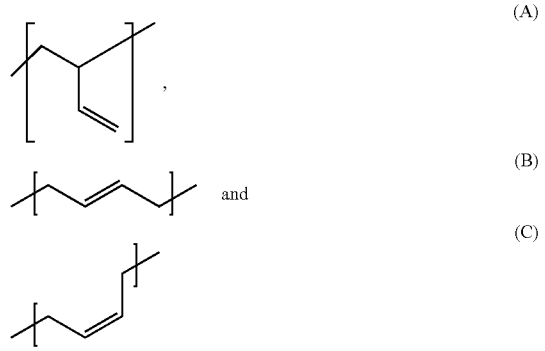

wherein the proportion of A in the entirety of the 1,3-butadiene-derived monomer units present in the polybutadiene is from 10 to 60 mol %, and wherein the sum of the proportions of B and C in the entirety of the 1,3-butadiene-derived monomer units present in the polybutadiene is from 40 to 90 mol %, wherein preferably the proportion of A, B and C in the entirety of the 1,3-butadiene-derived monomer units present in the polybutadiene is in each case and independently of one another at least 10%, wherein more preferably the proportion of A in the entirety of the 1,3-butadiene-derived monomer units present in the polybutadiene is from 10 to 30 mol %, the proportion of B in the entirety of the 1,3-butadiene-derived monomers units present in the polybutadiene is from 50 to 70 mol % and the proportion of C in the entirety of the 1,3-butadiene-derived monomer units present in the polybutadiene is from 15 to 30 mol %.

The process of the invention requires, as step a), the provision of a polybutadiene produced by free-radical polymerization and having hydroxyl groups. Such a polybutadiene having hydroxyl groups may be produced, for example, by polymerization of 1,3-butadiene in the presence of hydrogen peroxide, water and an organic solvent, as is described in EP12169794. In a preferred embodiment, the term "polybutadiene" as used herein is to be understood as meaning a product obtainable by polymerization of monomer units each having at least two conjugated double bonds, wherein in order of increasing preference, at least 80, 85, 90, 95, 98, 99 or 99.9% of the monomer units are 1,3-butadiene.

The OH-functionality of the hydroxyl-terminated polybutadienes is between 1 and 4, preferably between 2 and 3.

Step b) of the process according to the invention comprises reacting the hydroxyl-terminated polybutadiene having hydroxyl groups, preferably terminal hydroxyl groups, with one or more organosilane compounds. The organosilane compound/s are in particular selected from the group comprising compounds of formula I

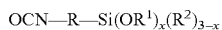   I where R represents linear or branched alkylene chains having 1-4 carbon atoms and $R^1$ and $R^2$ simultaneously or independently of one another represent linear or branched alkyl chains having 1-4 carbon atoms. In the cited reaction the NCO groups of the compounds of formula I react with the OH groups of the hydroxy-terminated polybutadienes to form —NH—CO—O— groups, which bond the compounds of formula I and of the hydroxy-terminated polybutadiene together.

Suitable compounds of formula I OCN—R—Si(OR$^1$)$_x$(R$^2$)$_{3-x}$ include in principle all of the possible compounds described hereinabove. It is particularly preferable when x=3 with $R^1$ selected from methyl and ethyl groups.

Suitable compounds of formula I include, for example, isocyanatoalkylalkoxysilanes in particular selected from the group comprising 3-isocyanatopropyltrimethoxysilane, 3-isocyanatopropyltriethoxysilane, 3-isocyanatopropyltriisopropoxysilane, 2-isocyanatoethyltrimethoxysilane, 2-isocyanatoethyltriethoxysilane, 2-isocyanatoethyltriisopropoxysilane, 4-isocyanatobutyltrimethoxysilane, 4-isocyanatobutyltriethoxysilane, 4-isocyanatobutyltriisopropoxysilanes, isocyanatomethyltrimethoxysilane, isocyanatomethyltriethoxysilane and/or isocyanatomethytriisopropoxysilane.

Particular preference is given to using 3-isocyanatopropyltrialkoxysilanes, in particular 3-isocyanatopropyltrimethoxysilane and/or isocyanatopropyltriethoxysilane, as compounds of formula I.

In step b), the molar ratio between terminal hydroxyl groups and the organosilane compound is in particular 0.3 to 1.1, preferably 0.6 to 1.0.

The reaction of the polybutadiene with hydroxyl groups in step b) is generally effected at temperatures between 20° C. to 70° C., preferably between 50° C. to 70° C. The reaction time is 0.5 to 3.5 h, generally 1.5 to 2 h.

Step b) of the abovementioned process is preferably effected under a protective gas atmosphere, preferably nitrogen or argon, particularly preferably nitrogen, and may be carried out in the presence or absence of a solvent. Step b) is preferably effected in the absence of a solvent. When a solvent is employed it is preferably selected from the group comprising aliphatics, aromatics, esters and ethers liquid at room temperature. In one embodiment, the solvent is an aliphatic liquid at room temperature, for example hexane, heptane, octane, cyclohexane, an aromatic liquid at room temperature (25° C.), for example benzene, toluene, an ester liquid at room temperature, for example ethyl acetate, butyl acetate, or an ether liquid at room temperature, for example diethyl ether and diisopropyl ether, dioxane and tetrahydrofuran. The nature and amount of the solvent depends on the employed polybutadiene having hydroxyl groups and on the amount of the organosilane compound. The proportion of the sum of polybutadiene having hydroxyl groups and organosilane compound is determined by the desired molar ratio. Production may be effected by initial cocharging of all reactants or else by stepwise or continuous addition of one or more reactants. If solvents are employed these may be removed under reduced pressure by evaporation.

To accelerate the reaction it is advantageously possible to use catalysts known from urethane chemistry such as carboxylates of Sn, Bi, Zn, Ti and other metals, for example bismuth(III) neodecanoate or dibutyltin dilaurate, but also tertiary amines such as, for example, 1,4-diazabicyclo[2.2.2]octane (DABCO) or triethylamine etc.

In a preferred embodiment, the silane-modified polybutadiene employed in accordance with the invention has an average functionality of from 0.1 to 4, preferably 0.7 to 2.6, particularly preferably 1.2 to 2.5. This means that a polybutadiene molecule has on average 0.1 to 4, preferably 0.7 to 2.6 and particularly preferably 1.2 to 2.5 silane groups irrespective of its length.

In the context of the present invention the silane-modified polybutadienes have the silane groups predominantly bonded to the chain ends of the polybutadiene chains and are therefore referred to in the context of the present invention as silane-terminated polybutadienes.

The polydienes, in particular polybutadienes, having terminal silane groups produced by the abovementioned process are particularly suitable for the use according to the invention in rubber mixtures.

The invention further provides rubber mixtures comprising the silane-modified polybutadienes according to the invention wherein the polybutadiene comprises the 1,3-butadiene-derived monomer units

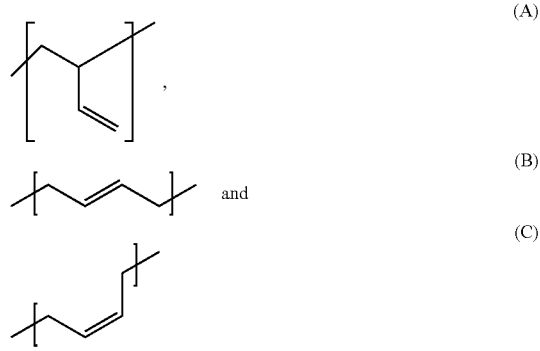

(A)

(B) and (C)

and wherein the proportion of A in the entirety of the 1,3-butadiene-derived monomer units present in the polybutadiene is from 10 to 60 mol %, and wherein the sum of the proportions of B and C in the entirety of the 1,3-butadiene-derived monomer units present in the polybutadiene is from 40 to 90 mol %.

The rubber mixtures according to the invention may be used for producing molded articles, in particular pneumatic tires, lightweight tires or tire treads.

The rubber mixtures according to the invention may comprise rubber, filler, preferably precipitated silica, optionally further rubber auxiliaries, and at least one inventive silane-modified polybutadiene.

The silane-modified polybutadienes according to the invention may be employed in amounts of from 0.5 to 25 parts by wt, preferably 1 to 15 parts by wt, particularly preferably 1 to 10 parts by wt, very particularly preferably 2 to 8 parts by wt, exceedingly preferably 5 to 8 parts by wt, based on 100 parts by wt of rubber.

The addition of the inventive silane-modified polybutadienes and the addition of the fillers is preferably effected at material temperatures of 100° C. to 200° C., particularly preferably at material temperatures of 130° C. to 170° C., but can also be effected at a later stage at material temperatures of from 40° C. to 100° C., for example together with further rubber auxiliaries.

The silane-modified polybutadienes according to the invention may be added to the mixing operation either in pure form or else applied to an organic or inorganic carrier. Preferred carrier materials are silicas, natural or synthetic silicates, aluminium oxide, waxes, polymers or carbon blacks.

The silane-modified polybutadiene according to the invention may also be added to the mixing operation pre-reacted with a biopolymeric, biooligomeric, oxidic or silicatic filler. Employable biopolymeric, biooligomeric, oxidic or silicatic fillers include natural and/or synthetic fillers.

The biopolymeric, biooligomeric, oxidic or silicatic filler may comprise —OH or -OAcetate, for example —O—C(O)—CH$_3$, groups on its surface which can react with the reactive alkoxy groups of the silane-modified polybutadienes employed.

Employable biopolymeric or biooligomeric fillers include natural or modified starch, cellulose, amylose, amylopectin, cellulose acetate, maltose, cellobiose, lactose, saccharose, raffinose, glycogen, pectins, chitin or natural or modified proteins.

Employable natural silicatic fillers include silicate, for example kaolin, mica, kiesulguhr, diatomaceous earth, talc, wollastonite or clay or else silicates, inter alia, in the form of glass fibres or glass fabrics.

Employable oxidic fillers include almost all types of oxides, for example aluminium oxide, aluminium hydroxide or trihydrate, zinc oxide, boron oxides, magnesium oxides or else transition metal oxides, such as titanium dioxide.

Employable oxidic or silicatic fillers further include aluminium silicates, silicates, zeolites, precipitated or pyrogenic silicas.

It is preferable when the biopolymeric, biooligomeric, oxidic or silicatic filler is precipitated silica.

The rubber mixtures may also comprise silicone oil and/or alkylsilane.

Fillers employable for the inventive rubber mixtures include:
Carbon blacks: The carbon blacks for use here are produced by the lamp black, furnace black or gas black process and have BET surface areas of 20 to 200 m$^2$/g, for example SAF, ISAF, HSAF, HAF, FEF or GPF blacks. The carbon blacks may optionally also contain heteroatoms, for example Si.

Silicas, preferably precipitated silicas, produced, for example, by precipitation of solutions of silicates, preferably water glass, or flame hydrolysis of silicon halides having specific surface areas of 5 to 1000. The precipitated silica may preferably have a BET surface area of 20 to 400 m$^2$/g, particularly preferably of 80 to 280 m$^2$/g, very particularly preferably of 150 to 210 m$^2$/g and exceedingly preferably of 80 to 185 m$^2$/g. The precipitated silica may have a primary particle size of 5 to 400 nm, preferably of 10 to 100 nm, particularly preferably of 10 to 40 nm. The silicas may optionally also be in the form of mixed oxides with other metal oxides, such as oxides of Al, Mg, Ca, Ba, Zn and titanium.

Synthetic silicates, such as aluminium silicate, alkaline earth metal silicates such as magnesium silicate or calcium silicate, having BET surface areas of 20 to 400 m$^2$/g and primary particle diameters of 10 to 400 nm.

Natural silicates, such as kaolin and other naturally occurring silicas.

Glass fibres and glass fibre products (mats, strands) or glass microbeads.

Carbon blacks having BET surface areas of 20 to 400 m$^2$/g or finely divided precipitated silicas having BET surface areas of 20 to 400 m$^2$/g for example may preferably be employed in amounts of 5 to 150 parts by wt, in each case based on 100 parts of rubber.

The cited fillers may be used alone or in admixture. In a particularly preferable embodiment the rubber mixture according to the invention may comprise 10 to 150 parts by wt of fillers, preferably precipitated silica, optionally together with 0 to 100 parts by wt of carbon black and also 0.5 to 25 parts by wt, preferably 1 to 15 parts by wt, particularly preferably 1 to 10 parts by wt, very particularly preferably 2 to 8 parts by wt, exceedingly preferably 5 to 8 parts by wt of an inventive silane-modified polybutadiene, in each case based on 100 parts by wt of rubber.

For the production of inventive rubber mixtures, not only natural rubber but also synthetic rubbers are suitable. Preferred synthetic rubbers are described, for example, in W. Hofmann, Kautschuktechnologie [Rubber Technology], Genter Verlag, Stuttgart 1980. These include inter alia
  polybutadiene (BR)
  polyisoprene (IR)
  styrene/butadiene copolymers having styrene contents of 1 to 60, preferably 2 to 50, wt % (SBR)
  isobutylene/isoprene copolymers (IIR)
  butadiene/acrylonitrile copolymers having acrylonitrile contents of 5 to 60, preferably 10 to 50, wt % (NBR)
  partly hydrogenated or fully hydrogenated NBR rubber (HNBR)
  ethylene/propylene/diene copolymers (EPDM)
and mixtures of these rubbers. Of interest for the production of motor vehicle tires are, in particular, anionically polymerized L-SBR rubbers having a glass transition temperature above −50° C. for example, and mixtures thereof with diene rubbers.

Rubbers which may preferably be employed include natural rubber or mixtures of natural rubber and diene rubber, preferably polybutadiene, polyisobutene or styrene butadiene copolymer. The inventive rubber vulcanizates may comprise further rubber auxiliary products such as reaction accelerators, ageing stabilizers, thermal stabilizers, light stabilizers, antiozonants, processing auxiliaries, plasticizers, resins, tackifiers, blowing agents, dyes, pigments, waxes, extenders, organic acids, retardants, metal oxides, and activators such as triethanolamine, polyethylene glycol, hexanetriol, which are known to the rubber industry.

The rubber auxiliaries are used in typical amounts determined inter alia by the end use. Typical amounts are, for example, amounts of 0.1 to 50 parts by wt based on rubber. It is generally advisable to add further crosslinkers. Further known crosslinkers that may be used include sulphur or peroxides. The inventive rubber mixtures may additionally comprise vulcanization accelerators. Examples of suitable vulcanization accelerators include mercaptobenzothiazoles, sulphenamides, guanidines, thiurams, dithiocarbamates, thioureas and thiocarbonates. The vulcanization accelerators and sulphur or peroxides can be used in amounts of 0.1 to 10 parts by wt, preferably 0.1 to 5 parts by wt, based on 100 parts by wt of rubber. The inventive rubber mixture may comprise one or more organosilanes. The organosilane may be an alkylsilane, vinylsilane, ethoxysilyl-containing mercaptoorganylsilane, ethoxysilyl-containing thiocyanatoorganylsilane, ethoxysilyl-containing blocked mercaptoorganylsilane or ethoxysilyl-containing di/polysulphidic alkoxysilane. The organosilane may preferably be triethoxyalkylsilane, triethoxyvinylsilane, triethoxytriethoxysilyl-containing mercaptoorganylsilane, triethoxysilyl-containing thiocyanatoorganylsilane, triethoxysilyl-containing blocked mercaptoorganylsilane or triethoxysilyl-containing di/polysulphidic alkoxysilane.

Further organosilanes that may be employed include mercaptoorganyl(alkoxysilanes) having $C_8H_{17}$—O—, $C_{10}H_{21}$—O—, $C_{12}H_{25}$—O—, $C_{14}H_{29}$—O—, $C_{16}H_{33}$—O— or $C_{18}H_{37}$—O— groups bonded to the silicon.

Further organosilanes that may be employed include blocked mercaptoorganyl(alkoxysilanes) having $C_8H_{17}$—O—, $C_{10}H_{21}$—O—, $C_{12}H_{25}$—O—, $C_{14}H_{29}$—O—, $C_{16}H_{33}$—O— or $C_{18}H_{37}$—O— groups bonded to the silicon or blocked mercaptoorganyl(alkoxysilanes) having difunctional alcohols (diols) bonded to the silicon (for example NXT LowV, NXT Ultra-LowV or silanes of the NXT Z group of products from Momentive).

Further organosilanes that may be employed include polysulphidic alkoxysilanes of the formulae EtO—Si(Me)$_2$—CH$_2$—CH$_2$—CH$_2$—S$_2$—CH$_2$—CH$_2$—CH$_2$—Si(Me)$_2$(OEt), EtO—Si(Me)$_2$-CH$_2$—CH$_2$—CH$_2$—S$_3$—CH$_2$—CH$_2$—CH$_2$—Si(Me)$_2$(OEt) or EtO—Si(Me)$_2$-CH$_2$—CH$_2$—CH$_2$—S$_4$—CH$_2$—CH$_2$—CH$_2$—Si(Me)$_2$(OEt).

Further organosilanes that may be added to the inventive rubber mixtures include 3-mercaptopropyl(triethoxysilane) (for example Si263 from Evonik Industries AG), 3-thiocyanatopropyl(triethoxysilane) (for example Si 264 from Evonik Industries AG), bis(triethoxysilylpropyl)polysulphide (for example Si 69 from Evonik Industries AG), bis(triethoxysilylpropyl)disulphide (for example Si 266 from Evonik Industries AG).

Further organosilanes that may be employed include alkylpolyether-alcohol-containing mercaptoorganylsilanes (for example Si 363 from Evonik Industries AG), alkylpolyether-alcohol-containing thiocyanatoorganylsilanes or/and alkylpolyether-alcohol-containing blocked mercaptoorganylsilanes or alkylpolyether-alcohol-containing polysulphidic silanes. The alkylpolyether-alcohol-containing mercaptoorganylsilanes may be compounds of general formula II

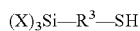  II where X is an alkyl, alkoxy or alkylpolyether group and at least one X is an alkylpolyether group, R$^3$ is a branched or unbranched, saturated or unsaturated, substituted or unsubstituted aliphatic, aromatic or mixedly aliphatic/aromatic divalent hydrocarbon group. The alkylpolyether-alcohol-containing blocked mercaptoorganylsilanes may be compounds of general formula III (X)$_3$Si—R$^4$—S—C(O)—R$^5$  III where X is an alkyl, alkoxy or alkylpolyether group and at least one X is an alkylpolyether group, R$^4$ is a branched or unbranched, saturated or unsaturated, substituted or unsubstituted aliphatic, aromatic or mixedly aliphatic/aromatic divalent hydrocarbon group and R$^5$ is a branched or unbranched, saturated or unsaturated, substituted or unsubstituted aliphatic, aromatic or mixedly aliphatic/aromatic monovalent hydrocarbon group, preferably $C_1$-$C_{25}^-$, particularly preferably $C_2$-$C_{22}^-$, very particularly preferably $C_7$-$C_{17}^-$ and exceedingly preferably $C_{11}$-$C_{16}^-$ hydrocarbon group.

The amount of organosilane may be 0.5 to 20 parts by wt, preferably 1 to 16 parts by wt, particularly preferably 2 to 12 parts by wt, very particularly preferably 3 to 7 parts by wt, based on 100 parts by wt of rubber (phr).

The rubber mixture according to the invention may preferably comprise natural rubber or mixtures of natural rubber and diene rubber, 10 to 150 parts by wt of precipitated silica, 0 to 100 parts by wt of carbon black, 0.5 to 20 parts by wt of organosilane and 0.5 to 25 parts by wt, preferably 1 to 15 parts by wt, particularly preferably 1 to 10 parts by wt, very particularly preferably 2 to 8 parts by wt, exceedingly preferably 5 to 8 parts by weight of an inventive silane-modified polybutadiene, in each case based on 100 parts by wt of rubber. The vulcanization of the inventive rubber mixtures can be effected at temperatures of 100 to 200° C., preferably 130 to 180° C., optionally under a pressure of 10 to 200 bar. The blending of the rubbers with the filler, any rubber auxiliaries and the inventive silane-modified polybutadienes may be carried out in customary mixing units, such as rollers, internal mixers and mixing extruders. The inventive rubber vulcanizates are suitable for producing molded articles. The inventive rubber mixtures may be used for producing tires, profiles, cable sheaths, hoses, drive belts, conveyor belts, tire treads, shoe soles, sealing rings and damping elements.

The present invention further provides the silane-terminated polybutadienes employed in accordance with the invention and obtainable by a process comprising the steps of a) providing a polybutadiene produced by free-radical polymerization and having hydroxyl groups, preferably terminal hydroxyl groups, b) reacting the polybutadiene having hydroxyl groups from step a) with an organosilane compound, wherein the polybutadiene comprises the 1,3-butadiene-derived monomer units

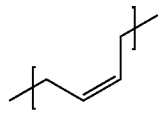

(A)

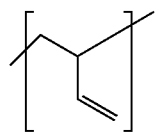 and 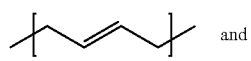

(B)

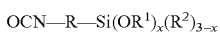

(C)

and wherein the proportion of A in the entirety of the 1,3-butadiene-derived monomer units present in the polybutadiene is from 10 to 60 mol %, and wherein the sum of the proportions of B and C in the entirety of the 1,3-butadiene-derived monomer units present in the polybutadiene is from 40 to 90 mol %.

Further preferred features of the polybutadienes have already been mentioned above.

The organosilane compound is in particular selected from the group comprising compounds of formula I OCN—R—Si(OR$^1$)$_x$(R$^2$)$_{3-x}$  I where R represents linear or branched alkylene chains having 1-4 carbon atoms and R$^1$ and R$^2$ simultaneously or independently of one another represent linear or branched alkyl chains having 1-5 carbon atoms. In the cited reaction the NCO groups of the compounds of formula I react with the OH groups of the hydroxy-terminated polybutadiene to form —NH—CO—O— groups, which bond the compounds of formula I and of the hydroxyl-terminated polybutadiene together.

Suitable compounds of formula I OCN—R—Si(OR$^1$)$_x$(R$^2$)$_{3-x}$ include in principle all of the possible compounds described hereinabove. It is particularly preferable when x=3 with R$^1$ selected from methyl and ethyl groups.

Suitable compounds of formula I include, for example, isocyanatoalkylalkoxysilanes in particular selected from the group comprising 3-isocyanatopropyltrimethoxysilane, 3-isocyanatopropyltriethoxysilane, 3-isocyanatopropyltriisopropoxysilane, 2-isocyanatoethyltrimethoxysilane, 2-isocyanatoethyltriethoxysilane, 2-isocyanatoethyltriisopropoxysilane, 4-isocyanatobutyltrimethoxysilane, 4-isocyanatobutyltriethoxysilane, 4-isocyanatobutyltriisopropoxysilanes, isocyanatomethyltrimethoxysilane, isocyanatomethyltriethoxysilane and/or isocyanatomethytriisopropoxysilane.

Particular preference is given to using 3-isocyanatopropyltrialkoxysilanes, in particular 3-isocyanatopropyltrimethoxysilane and/or isocyanatopropyltriethoxysilane, as compounds of formula I.

Even without further exposition it is believed that a person skilled in the art will be able to make the widest use of the above description. The preferred embodiments and examples are therefore to be understood merely as a descriptive disclosure which is not in any way intended to be limiting.

The present invention will now be more particularly described with reference to examples. Alternative embodiments of the present invention are obtainable analogously.

EXAMPLES

Production of the Silane-Modified Polybutadienes:
Raw Materials Employed:
Hydroxyl-terminated polybutadiene (POLYVEST® HT; Evonik), isocyanatopropyltriethoxysilane (Sigma Aldrich), isocyanatopropyltrimethoxysilane (Evonik), Coscat 83-bismuth trisneodecanoate/neodecanoic acid (58/42%) (C. H. Erbslöh); dibutyltin laurate (Sigma Aldrich).

Methods:

Gel permeation chromatography (GPC) of hydroxyl-terminated polybutadienes: Measurements were carried out at 40° C. in tetrahydrofuran (THF) at a concentration of 1 g/L and a flow rate of 0.3 ml/min. Chromatographic separation was achieved using a PSS SDV Micro 5μ/4.6×30 mm precolumn and a PSS SDV Micro linear S 5μ/4.6×250 mm (2×) separation column. Detection was by means of an RI detector. Calibration was carried out by means of a polybutadiene standard (PSS-Kit polybutadiene-1,4, Mp 831-106000, Part No.: PSS-bdfkit, Mn: 1830/4330/9300/18000/33500).

Gel permeation chromatography (GPC) of silane-terminated polybutadienes: Measurements were carried out at room temperature in tetrahydrofuran (THF) at a concentration of 5 g/L and a flow rate of 1 ml/min. Chromatographic separation was effected using a combination of styrene-divinylbenzene columns (2×3 cm, 5 μn, linear; 1×30 cm 5 μm, 100 Å). Detection was by means of an RI detector. Calibration was carried out by means of polystyrene standards and absolute molecular weights obtained via Mark-Houwink constants (a=0.73; k=0.0266 ml/g).

Viscosity Determination:

The viscosities (cone-plate) of the materials were determined to DIN 53018 with a Rheometer Physica MCR 301 from ANTON PAAR Germany GmbH.

Example 1

In a typical reaction 84.4 g of a hydroxyl-terminated polybutadiene produced by free-radical polymerization from Evonik and 0.05 wt % of the catalyst (COSCAT 83 or DBTL) were initially charged under nitrogen into a three-necked flask fitted with a dropping funnel and thermometer and heated to 60° C. Once this temperature had been reached 15.5 g of 3-isocyanatopropyltrimethoxysilane were added via the dropping funnel with stirring and the reaction mixture was stirred for three hours. The end of the reaction was ascertained by determining the residual isocyanate content (NCO<0.1%) by titration.

GPC (PS Standard): $M_n$=4.600 g/mol; $M_w$=11.600 g/mol; D=2.93

Viscosity (cone-plate, 20° C.): 8.9 Pa*s

Example 2

In a typical reaction 81.9 g of a hydroxyl-terminated polybutadiene produced by free-radical polymerization from Evonik Industries AG and 0.05 wt % of the catalyst (COSCAT 83 or DBTL) were initially charged under nitrogen into a three-necked flask fitted with a dropping funnel and thermometer and heated to 60° C. Once this temperature had been reached 18 g of 3-isocyanatopropyltrimethoxysilane were added via the dropping funnel with stirring and the reaction mixture was stirred for three hours. The end of the reaction was ascertained by determining the residual isocyanate content (NCO<0.1%) by titration. GPC (PS Standard): $M_n$=4.200 g/mol; $M_w$=10.500 g/mol; D=2.48

Viscosity (20° C.): 9.6 Pa*s

Example 2A

Produced as per example 2 using 81.9 g of hydroxyl-terminated polybutadiene and 18.0 g of 3-isocyanatopropyltriethoxysilane.

Viscosity (20° C.): 8.5 Pa*s

Example 2B

Produced as per example 2 using 83.4 g of hydroxyl-terminated polybutadiene and 16.6 g of 3-isocyanatopropyltriethoxysilane.

Viscosity (20° C.): 9.4 Pa*s

Example 2C

Produced as per example 2 using 84.7 g of hydroxyl-terminated polybutadiene and 15.2 g of 3-isocyanatopropyltriethoxysilane.

Viscosity (20° C.): 8.8 Pa*s

Example 2D

Produced as per example 2 using 86.5 g of hydroxyl-terminated polybutadiene and 13.4 g of 3-isocyanatopropyltriethoxysilane.

Viscosity (20° C.): 8.7 Pa*s

Example 2E

Produced as per example 2 using 88.2 g of hydroxyl-terminated polybutadiene and 11.7 g of 3-isocyanatopropyltriethoxysilane.

Viscosity (20° C.): 8.5 Pa*s

Example 2F

Produced as per example 2 using 87.2 g of hydroxyl-terminated polybutadiene and 12.7 g of 3-isocyanatopropyltriethoxysilane.

Viscosity (20° C.): 8.2 Pa*s

Example 2G

Produced as per example 2 using 89.5 g of hydroxyl-terminated polybutadiene and 10.5 g of 3-isocyanatopropyltriethoxysilane.

Viscosity (20° C.): 8.2 Pa*s

Example 2H

Produced as per example 2 using 91.9 g of hydroxyl-terminated polybutadiene and 8.1 g of 3-isocyanatopropyltriethoxysilane.

Viscosity (20° C.): 8.5 Pa*s

Example 2I

Produced as per example 2 using 94.4 g of hydroxyl-terminated polybutadiene and 5.5 g of 3-isocyanatopropyltriethoxysilane.

Viscosity (20° C.): 8.4 Pa*s

Example 2J

Produced as per example 2 using 97.1 g of hydroxyl-terminated polybutadiene and 2.8 g of 3-isocyanatopropyltriethoxysilane.

Viscosity (20° C.): 8.4 Pa*s

Example 3

In a typical reaction 94.43 g of a hydroxyl-terminated polybutadiene produced by anionic polymerization and 0.05 wt % of the catalyst (COSCAT 83 or DBTL) were initially charged under nitrogen into a three-necked round flask fitted with a dropping funnel and thermometer and heated to 60° C. Once the temperature had been reached 5.52 g of 3-isocyanatopropyltriethoxysilane were added via the dropping funnel with stirring and the reaction mixture was stirred for three hours. The end of the reaction was ascertained by determining the residual isocyanate content (NCO<0.1%) by titration.

GPC (PS Standard): $M_n$=4.800 g/mol; $M_w$=5.000 g/mol; D=1.04

Viscosity (20° C.): 27.8 Pa*s

Application Examples

Example 4: Rubber Mixtures I

The formulation used for the rubber mixtures is specified in table 1 below. In this table, the unit phr means parts by weight based on 100 parts of the crude rubber employed. The silane-modified polybutadiene according to the invention is employed as an additive in the inventive rubber mixtures in varying amounts.

TABLE 1

| substance | amount [phr] ref. rubber mixture I | amount [phr] inv. rubber mixture II comprising inv. example 1 | amount [phr] inv. rubber mixture III comprising inv. example 1 | amount [phr] inv. rubber mixture IV comprising inv. example 1 |
|---|---|---|---|---|
| 1st stage | | | | |
| NR SMR 10[a] | 100.0 | 100.0 | 100.0 | 100.0 |
| silica[b] | 55.0 | 55.0 | 55.0 | 55.0 |
| fatty acid[c] | 3.0 | 3.0 | 3.0 | 3.0 |
| ZnO[d] | 3.0 | 3.0 | 3.0 | 3.0 |
| 6PPD[e] | 1.0 | 1.0 | 1.0 | 1.0 |
| TMQ[f] | 1.0 | 1.0 | 1.0 | 1.0 |
| anti-ozonant wax[g] | 1.0 | 1.0 | 1.0 | 1.0 |
| Si 266[h] | 5.0 | 5.0 | 5.0 | 5.0 |
| example 1 | | 2.5 | 5.0 | 7.5 |
| 2nd stage stage 1 batch | | | | |
| 3rd stage stage 2 batch | | | | |
| DPG-80[i] | 2.5 | 2.5 | 2.5 | 2.5 |
| CBS[j] | 1.0 | 1.0 | 1.0 | 1.0 |
| sulphur[k] | 2.0 | 2.0 | 2.0 | 2.0 |

Substances used:
[a]NR TSR: SMR 10 from Nordmann, Rassmann GmbH (TSR = Technically Specified Rubber; SMR = Standard Malaysian Rubber)
[b]silica: ULTRASIL ® 7000 GR from Evonik Industries AG.
[c]EDENOR ST1 GS fatty acid mixture, Caldic Deutschland Chemie B.V.
[d]ZnO: RS RAL 844 C ZnO from Arnsperger Chemikalien GmbH.
[e]6PPD: Vulkanox 4020/LG N-(1,3-dimethylbutyl)-N'-phenyl-p-phenylene diamine from Rhein Chemie Rheinau GmbH.
[f]TMQ: Vulkanox HS/LG polymerized 2,2,4-trimethyl-1,2-dihydroquinoline from Rhein Chemie Rheinau GmbH.
[g]antiozonant wax: Protektor G3108 from Paramelt B.V.
[h]Si 266 ®: bis(triethoxysilylpropyl)disulphide from Evonik Industries AG.
[i]DPG-80: Rhenogran ® DPG-80 mixture of 80% N,N'-diphenylguanidine and of 20% elastomeric carrier and dispersant from Rhein Chemie GmbH.
[j]CBS: CZ/EG-C N-cyclohexyl-2-benzothiazolesulphenamide from Rhein Chemie Rheinau GmbH.
[k]sulphur: Mahlschwefel 80/90° from Solvay & CPC Barium Strontium GmbH & Co. KG.

The mixtures are prepared in three stages in a 1.51 internal mixer (E-type) at a batch temperature of 150° C. in accordance with the mixing instructions in table 2.

TABLE 2

| stage 1 | |
|---|---|
| settings | |
| mixing unit | HF mixing group GmbH; type GK 1.5 E |
| fill level | 0.58 |
| speed | 70 rpm |
| ram pressure | 5.5 bar |
| flow temp. | 70° C. |
| mixing operation | |
| 0 to 0.5 min | SMR 10 |
| 0.5 min | ½ ULTRASIL 7000 GR, Si 266, ZnO, fatty acid, inventive silane-modified polybutadiene (if present) |
| 0.5 to 1.5 min | mix |
| 1.5 min | vent and purge |
| 1.5 to 2.5 min | ½ ULTRASIL 7000 GR, antiozonant wax, 6PPD, TMQ |
| 2.5 to 4 min | mix at 150° C., optionally varying speed |
| 4 min | vent and purge |
| 4 to 5.5 min | mix at 150° C., optionally varying speed |
| 5.5 min | discharge and form milled sheet on laboratory mixing roll mill for 45 s (laboratory roll mill: diameter 250 mm, length 190 mm, roll gap 4 mm, flow temperature 60° C.) |

TABLE 2-continued 24 h storage at room temperature
stage 2 settings

| | |
|---|---|
| mixing unit | as in stage 1 except |
| fill level | 0.55 |
| speed | 80 rpm |
| ram pressure | 5.5 bar |
| flow temp. | 80° C. | mixing operation

| | |
|---|---|
| 0 to 1 min | break up stage 1 batch |
| 1 to 3 min | mix at 150° C., optionally varying speed |
| 3 min | discharge and form milled sheet on laboratory mixing roll mill for 45 s (laboratory roll mill: diameter 250 mm, length 190 mm, roll gap 4 mm, flow temperature 60° C.) |

24 h storage at room temperature
stage 3 settings

| | |
|---|---|
| mixing unit | as in stage 1 except |
| fill level | 0.52 |
| speed | 60 rpm |
| flow temp. | 50° C. | mixing operation

| | |
|---|---|
| 0 to 2 min | break up stage 2 batch, accelerant and sulphur, mix at 100° C., optionally varying speed |
| 2 min | discharge and form milled sheet on laboratory mixing roll mill for 20 s, then, over a further 40 s, cut and fold over 3* to the left, 3* to the right and roll 3* with a narrow roll gap (3 mm) and then draw off a milled sheet. (laboratory roll mill: diameter 250 mm, length 190 mm, roll gap 3-4 mm, flow temperature 80° C.) |

The general process for producing rubber mixtures and vulcanizates thereof is described in "Rubber Technology Handbook", W. Hofmann, Hanser Verlag 1994.

Vulcanization is effected at a temperature of 150° C. in a typical vulcanizing press with a holding pressure of 120 bar after $t_{95\%}$. The $t_{95\%}$ time was determined by moving disc rheometer (rotorless vulcameter) to DIN 53529/3 at 150° C.

The rubber testing is effected in accordance with the test methods specified in table 3.

Table 4 reports the rubber data for the vulcanizates.

TABLE 3

| physical testing | standard/conditions |
|---|---|
| DIN abrasion abrasion [mm]³⁾ | ISO 4649 |
| ring tensile test at 23° C. 300% modulus/MPa | ISO 37 |
| Shore A hardness at 23° C. Shore A hardness/SH | ISO 7619-1 |
| ball rebound, 60° C. rebound resilience/% | DIN EN ISO 8307 fall height 500 mm, steel ball d = 19 mm, 28 g |
| viscoelastic properties of the vulcanizate at 60° C. maximum loss factor tan δ | RPA 2000 Rubber Process Analyzer (Alpha Technologies), strain sweep, 1.7 Hz, 0.28%-42% elongation; see "RPA 2000 Operators Manual", Alpha Technologies, February 1997 |
| viscoelastic properties at 60° C. loss factor tan δ | ISO 4664-1 16 Hz, initial force 50 N and amplitude force 25 N, heat treatment time 5 min, parameters recorded after 30 s testing time |

TABLE 4

| vulcanizate results: | ref. rubber mixture I | inv. rubber mixture II comprising inv. example 1 | inv. rubber mixture III comprising inv. example 1 | inv. rubber mixture IV comprising inv. example 1 |
|---|---|---|---|---|
| DIN abrasion abrasion [mm]³⁾ | 153 | 143 | 136 | 134 |
| ring tensile test at 23° C. 300% modulus/MPa | 12.2 | 12.6 | 14.1 | 14.6 |
| Shore A hardness Shore A hardness/SH | 68 | 66 | 67 | 69 |
| ball rebound rebound resilience at 60° C./% | 71.9 | 72.7 | 75.6 | 77.3 |
| viscoelastic properties, 60° C., Rubber Process Analyzer (RPA), strain sweep, 1.7 Hz, 0.28%-42% elongation maximum loss factor tan δ/— | 0.187 | 0.143 | 0.116 | 0.100 |
| viscoelastic properties at 60° C., 16 Hz, initial force 50 N, ampl. force 25 N loss factor tan δ/— | 0.072 | 0.064 | 0.049 | 0.042 |

The inventive rubber mixtures II-IV show improved rolling resistance (lower tan δ values and higher rebound resiliences at 60° C.) compared to the reference rubber mixture I. This positive effect increases as the amount of inventive silane-modified polybutadiene increases from mixture II to mixture IV. Addition of inventive silane-modified polybutadiene further achieves improved reinforcing characteristics (300% modulus) and lower abrasion (DIN abrasion).

Example 5: Rubber Mixtures II

The formulation used for the rubber mixtures is specified in table 5 below. In this table, the unit phr means parts by weight based on 100 parts of the crude rubber employed. In the inventive rubber mixtures the silane-modified polybutadienes according to the invention are employed as an additive and partially replace the sulphur silane.

TABLE 5

| substance | amount [phr] ref. rubber mixture V | Amount [phr] inv. rubber mixture VI comprising inv. example 1 | Amount [phr] inv. rubber mixture VII comprising inv. example 2 |
|---|---|---|---|
| 1st stage | | | |
| NR SMR 10[a] | 100.0 | 100.0 | 100.0 |
| silica[b] | 55.0 | 55.0 | 55.0 |
| fatty acid[c] | 3.0 | 3.0 | 3.0 |
| ZnO[d] | 3.0 | 3.0 | 3.0 |
| 6PPD[e] | 1.0 | 1.0 | 1.0 |
| TMQ[f] | 1.0 | 1.0 | 1.0 |
| antiozonant wax[g] | 1.0 | 1.0 | 1.0 |
| Si 266[h] | 5 | 4 | 4 |
| example 1 | | 7.5 | |
| example 2 | | | 7.5 |
| 2nd stage | | | |
| stage 1 batch | | | |
| 3rd stage | | | |
| stage 2 batch | | | |
| DPG-80[i] | 2.5 | 2.5 | 2.5 |
| CBS[j] | 1.0 | 1.0 | 1.0 |
| sulphur[k] | 2.0 | 2.0 | 2.0 |

Substances used:
[a]NR TSR: SMR 10 from Nordmann, Rassmann GmbH (TSR = Technically Specified Rubber; SMR = Standard Malaysian Rubber)
[b]silica: ULTRASIL ® 7000 GR from Evonik Industries AG.
[c]fatty acid: EDENOR ST1 GS fatty acid mixture, Caldic Deutschland Chemie B.V.
[d]ZnO: RS RAL 844 C ZnO from Arnsperger Chemikalien GmbH.
[e]6PPD: Vulkanox 4020/LG N-(1,3-dimethylbutyl)-N'-phenyl-p-phenylene diamine from Rhein Chemie Rheinau GmbH.
[f]TMQ: Vulkanox HS/LG polymerized 2,2,4-trimethyl-1,2-dihydroquinoline from Rhein Chemie Rheinau GmbH.
[g]antiozonant wax: Protektor G3108 from Paramelt B.V.
[h]Si 266 ®: bis(triethoxysilylpropyl)disulphide from Evonik Industries AG.
[i]DPG-80: Rhenogran ® DPG-80 mixture of 80% N,N'-diphenylguanidine and of 20% elastomeric carrier and dispersant from Rhein Chemie GmbH.
[j]CBS: CZ/EG-C N-cyclohexyl-2-benzothiazolesulphenamide from Rhein Chemie Rheinau GmbH.
[k]sulphur: Mahlschwefel 80/90° from Solvay & CPC Barium Strontium GmbH & Co. KG.

The mixtures are prepared in three stages in a 1.51 internal mixer (E-type) at a batch temperature of 150° C. in accordance with the mixing instructions in table 6.

TABLE 6

| stage 1 | |
|---|---|
| settings | |
| mixing unit | HF mixing group GmbH; type GK 1.5 E |
| fill level | 0.65 |
| speed | 70 rpm |
| ram pressure | 5.5 bar |
| flow temp. | 70° C. |

TABLE 6-continued

| mixing operation | |
|---|---|
| 0 to 0.5 min | SMR 10 |
| 0.5 min | ½ ULTRASIL 7000 GR, Si 266, ZnO, fatty acid, inventive silane-modified polybutadiene (if present) |
| 0.5 to 1.5 min | mix |
| 1.5 min | vent and purge |
| 1.5 to 2.5 min | ½ ULTRASIL 7000 GR, antiozonant wax, 6PPD, TMQ |
| 2.5 to 4 min | mix at 150° C., optionally varying speed |
| 4 min | vent |
| 4 to 5.5 min | mix at 150° C., optionally varying speed |
| 5.5 min | discharge and form milled sheet on laboratory mixing roll mill for 45 s (laboratory roll mill: diameter 250 mm, length 190 mm, roll gap 4 mm, flow temperature 60° C.) 24 h storage at room temperature |
| stage 2 | |
| settings | |
| mixing unit | as in stage 1 except |
| fill level | 0.62 |
| speed | 80 rpm |
| ram pressure | 5.5 bar |
| flow temp. | 80° C. |
| mixing operation | |
| 0 to 1 min | break up stage 1 batch |
| 1 to 3 min | mix at 150° C., optionally varying speed |
| 3 min | discharge and form milled sheet on laboratory mixing roll mill for 45 s (laboratory roll mill: diameter 250 mm, length 190 mm, roll gap 4 mm, flow temperature 60° C.) 4 h storage at room temperature |
| stage 3 | |
| settings | |
| mixing unit | as in stage 1 except |
| fill level | 0.59 |
| speed | 60 rpm |
| flow temp. | 50° C. |
| mixing operation | |
| 0 to 2 min | break up stage 2 batch, accelerant and sulphur, mix at 100° C., optionally varying speed |
| 2 min | discharge and form milled sheet on laboratory mixing roll mill for 20 s, then, over a further 40 s: cut and fold over 3* to the left, 3* to the right and roll 3* with a narrow roll gap (3 mm) and then draw off a milled sheet. (laboratory roll mill: diameter 250 mm, length 190 mm, roll gap 3-4 mm, flow temperature 80° C.) |

The general process for producing rubber mixtures and vulcanizates thereof is described in "Rubber Technology Handbook", W. Hofmann, Hanser Verlag 1994.

Vulcanization is effected at a temperature of 150° C. in a typical vulcanizing press with a holding pressure of 120 bar after $t_{95\%}$. The $t_{95\%}$ time is determined by moving disc rheometer (rotorless vulcameter) to DIN 53529/3 at 150° C.

The rubber testing is effected in accordance with the test methods specified in table 3.

Table 7 reports the rubber data for the vulcanizates.

TABLE 7

| vulcanizate results: | ref. rubber mixture V | inv. rubber mixture VI comprising Inv. example 1 | inv. rubber mixture VII comprising inv. example 2 |
|---|---|---|---|
| DIN abrasion abrasion [mm][3] | 129 | 114 | 119 |
| ring tensile test at 23° C. | 12.6 | 13.0 | 13.9 |

TABLE 7-continued

| vulcanizate results: | ref. rubber mixture V | inv. rubber mixture VI comprising Inv. example 1 | inv. rubber mixture VII comprising inv. example 2 |
|---|---|---|---|
| 300% modulus/ MPa |  |  |  |
| Shore A hardness | 62 | 62 | 64 |
| Shore A hardness/ SH |  |  |  |
| ball rebound rebound resilience at 60° C./% | 71.2 | 76.8 | 76.6 |
| viscoelastic properties, 60° C., Rubber Process Analyzer (RPA), strain sweep, 1.7 Hz, 0.28%-42% elongation maximum loss factor tan δ/— | 0.137 | 0.086 | 0.092 |
| viscoelastic properties at 60° C., 16 Hz, initial force 50 N, ampl. force 25 N loss factor tan δ/— | 0.067 | 0.055 | 0.051 |

The inventive rubber mixtures VI-VII show improved rolling resistance (lower tan δ values and higher rebound resiliences at 60° C.) compared to the reference rubber mixture V. Addition of inventive silane-modified polybutadiene further achieves improved reinforcing characteristics (300% modulus) and lower abrasion (DIN abrasion).

Example 6: Rubber Mixtures III

The formulations used for the rubber mixtures are specified in table 8 below. In this table, the unit phr means parts by weight based on 100 parts of the crude rubber employed. In the inventive rubber mixtures the silane-modified polybutadienes according to the invention are employed as an additive and partially replace the sulphur silane.

TABLE 8

| substance | amount [phr] ref. rubber mixture VIII | amount [phr] ref. rubber mixture IX comprising comparative example hydroxyl-terminated polybutadiene | amount [phr] inv. rubber mixture X comprising inv. example 2A: | amount [phr] inv. rubber mixture XI comprising inv. example 2B | amount [phr] inv. rubber mixture XII comprising inv. example 2C | amount [phr] inv. rubber mixture XIII comprising inv. example 2D | amount [phr] inv. rubber mixture XIV comprising inv. example 2E |
|---|---|---|---|---|---|---|---|
| 1st stage |  |  |  |  |  |  |  |
| NR SMR 10[a] | 100.0 | 100.0 | 100.0 | 100.0 | 100.0 | 100.0 | 100.0 |
| silica[b] | 55.0 | 55.0 | 55.0 | 55.0 | 55.0 | 55.0 | 55.0 |
| fatty acid[c] | 3.0 | 3.0 | 3.0 | 3.0 | 3.0 | 3.0 | 3.0 |
| ZnO[d] | 3.0 | 3.0 | 3.0 | 3.0 | 3.0 | 3.0 | 3.0 |
| 6PPD[e] | 1.0 | 1.0 | 1.0 | 1.0 | 1.0 | 1.0 | 1.0 |
| TMQ[f] | 1.0 | 1.0 | 1.0 | 1.0 | 1.0 | 1.0 | 1.0 |
| antiozonant wax[g] | 1.0 | 1.0 | 1.0 | 1.0 | 1.0 | 1.0 | 1.0 |
| Si 266[h] | 5 | 4 | 4 | 4 | 4 | 4 | 4 |
| hydroxyl-terminated polybutadiene[i] |  | 7.5 |  |  |  |  |  |
| example 2A |  |  | 7.5 |  |  |  |  |
| example 2B |  |  |  | 7.5 |  |  |  |
| example 2C |  |  |  |  | 7.5 |  |  |
| example 2D |  |  |  |  |  | 7.5 |  |
| example 2E |  |  |  |  |  |  | 7.5 |
| 2nd stage stage 1 batch |  |  |  |  |  |  |  |

TABLE 8-continued

| substance | amount [phr] ref. rubber mixture VIII | amount [phr] ref. rubber mixture IX comprising comparative example hydroxyl-terminated polybutadiene | amount [phr] inv. rubber mixture X comprising inv. example 2A: | amount [phr] inv. rubber mixture XI comprising inv. example 2B | amount [phr] inv. rubber mixture XII comprising inv. example 2C | amount [phr] inv. rubber mixture XIII comprising inv. example 2D | amount [phr] inv. rubber mixture XIV comprising inv. example 2E |
|---|---|---|---|---|---|---|---|
| 3rd stage Stage 2 batch | | | | | | | |
| DPG-80[j] | 2.5 | 2.5 | 2.5 | 2.5 | 2.5 | 2.5 | 2.5 |
| CBS[k] | 1.0 | 1.0 | 1.0 | 1.0 | 1.0 | 1.0 | 1.0 |
| sulphur[l] | 2.0 | 2.0 | 2.0 | 2.0 | 2.0 | 2.0 | 2.0 |

[a] NR TSR: SMR 10 from Nordmann, Rassmann GmbH (TSR = Technically Specified Rubber; SMR = Standard Malaysian Rubber)
[b] silica: ULTRASIL ® 7000 GR from Evonik Industries AG.
[c] fatty acid: EDENOR ST1 GS fatty acid mixture, Caldic Deutschland Chemie B.V.
[d] ZnO: RS RAL 844 C ZnO from Arnsperger Chemikalien GmbH.
[e] 6PPD: Vulkanox 4020/LG N-(1,3-dimethylbutyl)-N'-phenyl-p-phenylene diamine from Rhein Chemie Rheinau GmbH.
[f] TMQ: Vulkanox HS/LG polymerized 2,2,4-trimethyl-1,2-dihydroquinoline from Rhein Chemie Rheinau GmbH.
[g] antiozonant wax: Protektor G3108 from Paramelt B.V.
[h] Si 266 ®: bis(triethoxysilylpropyl)disulphide from Evonik Industries AG. #
[i] Hydroxyl-terminated polybutadiene (POLYVEST HT) from Evonik
[j] DPG-80: Rhenogran ® DPG-80 mixture of 80% N,N'-diphenylguanidine and of 20% elastomeric carrier and dispersant from Rhein Chemie GmbH.
[k] CBS: CZ/EG-C N-cyclohexyl-2-benzothiazolesulphenamide from Rhein Chemie Rheinau GmbH.
[l] sulphur: Mahlschwefel 80/90° from Solvay & CPC Barium Strontium GmbH & Co. KG The mixtures are prepared in three stages in a 1.51 internal mixer (E-type) at a batch temperature of 150° C. in accordance with the mixing instructions in table 9.

TABLE 9

| stage 1 | |
|---|---|
| settings | |
| mixing unit | HF mixing group GmbH; type GK 1.5 E |
| fill level | 0.65 |
| speed | 70 rpm |
| ram pressure | 5.5 bar |
| flow temp. | 70° C. |
| mixing operation | |
| 0 to 0.5 min | SMR 10 |
| 0.5 min | ½ ULTRASIL 7000 GR less 20 g, Si 266, ZnO, fatty acid, inventive silane-modified polybutadiene (if present) mixed directly prior to addition with 20 g of ULTRASIL 7000 GR from the first half of the ULTRASIL 7000 GR |
| 0.5 to 1.5 min | mix |
| 1.5 min | vent and purge |
| 1.5 to 2.5 min | ½ ULTRASIL 7000 GR, antiozonant wax, 6PPD, TMQ |
| 2.5 min | vent and purge |
| 2.5 to 4.0 min | mix at 150° C., optionally varying speed |
| 4.0 min | vent |
| 3 to 5.5 min | mix at 150° C., optionally varying speed |
| 5.5 min | discharge and form milled sheet on laboratory mixing roll mill for 45 s (laboratory roll mill: diameter 250 mm, length 190 mm, roll gap 4 mm, flow temperature 60° C.) 24 h storage at room temperature |
| stage 2 | |
| settings | |
| mixing unit | as in stage 1 except |
| fill level | 0.62 |
| speed | 80 rpm |
| flow temp. | 80° C. |

TABLE 9-continued

| mixing operation | |
|---|---|
| 0 to 1.0 min | break up stage 1 batch |
| 1.0 to 3.0 min | mix at 150° C., optionally varying speed |
| 3.0 min | discharge and form milled sheet on laboratory mixing roll mill for 45 s (laboratory roll mill: diameter 250 mm, length 190 mm, roll gap 4 mm, flow temperature 60° C.) 24 h storage at room temperature |
| stage 3 | |
| settings | |
| mixing unit | as in stage 1 except |
| fill level | 0.59 |
| speed | 60 rpm |
| flow temp. | 50° C. |
| mixing operation | |
| 0 to 2.0 min | break up stage 2 batch, accelerant and sulphur, mix at 100° C., optionally varying speed |
| 2.0 min | discharge and form milled sheet on laboratory mixing roll mill for 20 s, then, over a further 40 s: cut and fold over 3* to the left, 3* to the right and roll 3* with a narrow roll gap (3 mm) and then draw off a milled sheet. (laboratory roll mill: diameter 250 mm, length 190 mm, roll gap 3-4 mm, flow temperature 80° C.) |

The general process for producing rubber mixtures and vulcanizates thereof is described in "Rubber Technology Handbook", W. Hofmann, Hanser Verlag 1994.

Vulcanization is effected at a temperature of 150° C. in a typical vulcanizing press with a holding pressure of 120 bar after $t_{95\%}$. The $t_{95\%}$ time was determined by moving disc rheometer (rotorless vulcameter) to DIN 53529/3 at 150° C.

The rubber testing is effected in accordance with the test methods specified in table 3.

Table 10 reports the rubber data for the vulcanizates.

TABLE 10

| vulcanizate results: | ref. rubber mixture VIII | ref. rubber mixture IX comprising comparative example hydroxyl-terminated polybutadiene | inv. rubber mixture X comprising Inv. example 2A | inv. rubber mixture XI comprising inv. example 2B | inv. rubber mixture XII comprising inv. example 2C | inv. rubber mixture XIII comprising inv. example 2D | inv. rubber mixture XIV comprising Inv. example 2E |
|---|---|---|---|---|---|---|---|
| DIN abrasion abrasion [mm][3] | 124 | 127 | 113 | 112 | 111 | 105 | 113 |
| ring tensile test at 60° C. 300% modulus/MPa | 12.1 | 8.6 | 13.6 | 12.6 | 12.8 | 11.7 | 11.6 |
| Shore A hardness Shore A hardness/SH | 62 | 57 | 64 | 62 | 64 | 62 | 62 |
| ball rebound rebound resilience at 60° C./% | 68.5 | 70.7 | 73.8 | 72.9 | 74.5 | 73.1 | 72.5 |
| viscoelastic properties, 60° C., Rubber Process Analyzer (RPA), strain sweep, 1.7 Hz, 0.28%-42% elongation maximum loss factor tan δ/— | 0.147 | 0.114 | 0.098 | 0.096 | 0.095 | 0.100 | 0.103 |
| viscoelastic properties at 60° C., 16 Hz, initial force 50 N, ampl. force 25 N loss factor tan δ/— | 0.077 | 0.069 | 0.053 | 0.052 | 0.051 | 0.055 | 0.055 |

The inventive rubber mixtures X to XIV show improved rolling resistance (lower tan δ values and higher rebound resiliences at 60° C.) and improved DIN abrasion compared to the reference rubber mixture VIII.

When the degree of silane modification of the polybutadiene is zero (reference rubber mixture IX) the advantages compared to the reference rubber mixture VIII are not present (DIN abrasion, 300% modulus) or markedly less pronounced (tan δ and rebound resilience at 60° C.).

Example 7: Rubber Mixtures IV

The formulations used for the rubber mixtures are specified in table 8 below. In this table, the unit phr means parts by weight based on 100 parts by weight of the crude rubber used. The silane-modified polybutadienes according to the invention are employed as an additive in the inventive rubber mixtures and replace the sulphur silane proportionately.

TABLE 11

| substance | amount [phr] ref. rubber mixture XV | amount [phr] inv. rubber mixture XVI, comprising inv. example 2F | amount [phr] inv. rubber mixture XVII, comprising inv. example 2G | amount [phr] inv. rubber mixture XIII, comprising inv. example 2H | amount [phr] inv. rubber mixture XIX, comprising inv. example 2I | amount [phr] inv. rubber mixture XX, comprising inv. example 2J | amount [phr] inv. rubber mixture XXI, comprising inv. example 3 |
|---|---|---|---|---|---|---|---|
| 1st stage | | | | | | | |
| NR SMR 10[a] | 100.0 | 100.0 | 100.0 | 100.0 | 100.0 | 100.0 | 100.0 |
| silica[b] | 55.0 | 55.0 | 55.0 | 55.0 | 55.0 | 55.0 | 55.0 |
| fatty acid[c] | 3.0 | 3.0 | 3.0 | 3.0 | 3.0 | 3.0 | 3.0 |
| ZnO[d] | 3.0 | 3.0 | 3.0 | 3.0 | 3.0 | 3.0 | 3.0 |
| 6PPD[e] | 1.0 | 1.0 | 1.0 | 1.0 | 1.0 | 1.0 | 1.0 |
| TMQ[f] | 1.0 | 1.0 | 1.0 | 1.0 | 1.0 | 1.0 | 1.0 |
| antiozonant wax[g] | 1.0 | 1.0 | 1.0 | 1.0 | 1.0 | 1.0 | 1.0 |
| Si 266[h] | 5 | 4 | 4 | 4 | 4 | 4 | 4 |
| example 2E | | 7.5 | | | | | |
| example 2F | | | 7.5 | | | | |
| example 2G | | | | 7.5 | | | |
| example 2H | | | | | 7.5 | | |
| example 2I | | | | | | 7.5 | |
| example 3 | | | | | | | 7.5 |

TABLE 11-continued

| substance | amount [phr] ref. rubber mixture XV | amount [phr] inv. rubber mixture XVI, comprising inv. example 2F | amount [phr] inv. rubber mixture XVII, comprising inv. example 2G | amount [phr] inv. rubber mixture XIII, comprising inv. example 2H | amount [phr] inv. rubber mixture XIX, comprising inv. example 2I | amount [phr] inv. rubber mixture XX, comprising inv. example 2J | amount [phr] inv. rubber mixture XXI, comprising inv. example 3 |
|---|---|---|---|---|---|---|---|
| 2nd stage |  |  |  |  |  |  |  |
| stage 1 batch |  |  |  |  |  |  |  |
| 3rd stage |  |  |  |  |  |  |  |
| stage 2 batch |  |  |  |  |  |  |  |
| DPG-80[j] | 2.5 | 2.5 | 2.5 | 2.5 | 2.5 | 2.5 | 2.5 |
| CBS[k] | 1.0 | 1.0 | 1.0 | 1.0 | 1.0 | 1.0 | 1.0 |
| sulphur[l] | 2.0 | 2.0 | 2.0 | 2.0 | 2.0 | 2.0 | 2.0 |

[a]NR TSR: SMR 10 from Nordmann, Rassmann GmbH (TSR = Technically Specified Rubber; SMR = Standard Malaysian Rubber).
[b]silica: ULTRASIL ® 7000 GR from Evonik Industries AG.
[c]fatty acid: EDENOR ST1 GS fatty acid mixture, Caldic Deutschland Chemie B.V.
[d]ZnO: RS RAL 844 C ZnO from Arnsperger Chemikalien GmbH.
[e]6PPD: Vulkanox 4020/LG N-(1,3-dimethylbutyl)-N'-phenyl-p-phenylene diamine from Rhein Chemie Rheinau GmbH.
[f]TMQ: Vulkanox HS/LG polymerized 2,2,4-trimethyl-l,2-dihydroquinoline from Rhein Chemie Rheinau GmbH.
[g]antiozonant wax: Protektor G3108 from Paramelt B.V.
[h]Si 266 ®: bis(triethoxysilylpropyl)disulphide from Evonik Industries AG.
[i] hydroxyl-terminated polybutadiene (POLYVEST HT) from Evonik
[j]DPG-80: Rhenogran ® DPG-80 mixture of 80% N,N'-diphenylguanidine and of 20% elastomeric carrier and dispersant from Rhein Chemie GmbH.
[k]CBS: CZ/EG-C N-cyclohexyl-2-benzothiazolesulphenamide from Rhein Chemie Rheinau GmbH.
[l]sulphur: Mahlschwefel 80/90° from Solvay & CPC Barium Strontium GmbH & Co. KG The mixtures are prepared in three stages in a 1.5 l internal mixer (E-type) at a batch temperature of 150° C. in accordance with the mixing instructions in table 9.

TABLE 12

| stage 1 | |
|---|---|
| settings | |
| mixing unit | HF mixing group GmbH; type GK 1.5 E |
| fill level | 0.65 |
| speed | 70 rpm |
| ram pressure | 5.5 bar |
| flow temp. | 70° C. |
| Mixing process | |
| 0 to 0.5 min | SMR 10 |
| 0.5 min | ½ ULTRASIL 7000 GR less 20 g, Si 266, ZnO, fatty acid, inventive silane-modified polybutadiene (if present) mixed directly prior to addition with 20 g of ULTRASIL 7000 GR from the first half of the ULTRASIL 7000 GR |
| 0.5 to 1.5 min | mix |
| 1.5 min | vent and purge |
| 1.5 to 2.5 min | ½ ULTRASIL 7000 GR, antiozonant wax, 6PPD, TMQ |
| 2.5 min | vent and purge |
| 2.5 to 4.0 min | mix at 150° C., optionally varying speed |
| 4.0 min | vent |
| 3 to 5.5 min | mix at 150° C., optionally varying speed |
| 5.5 min | discharge and form milled sheet on laboratory mixing roll mill for 45 s (laboratory roll mill: diameter 250 mm, length 190 mm, roll gap 4 mm, flow temperature 60° C.) 24 h storage at room temperature |
| stage 2 | |
| settings | |
| mixing unit | as in stage 1 except |
| fill level | 0.62 |
| speed | 80 rpm |
| flow temp | 80° C. |
| mixing operation | |
| 0 to 1.0 min | break up stage 1 batch |
| 1.0 to 3.0 min | mix at 150° C., optionally varying speed |
| 3.0 min | discharge and form milled sheet on laboratory mixing roll mill for 45 s (laboratory roll mill: diameter 250 mm, length 190 mm, roll gap 4 mm, flow temperature 60° C.) 24 h storage at room temperature |
| stage 3 | |
| settings | |
| mixing unit | as in stage 1 except |
| fill level | 0.59 |
| speed | 60 rpm |
| flow temp. | 50° C. |
| mixing operation | |
| 0 to 2.0 min | break up stage 2 batch, accelerant and sulphur, mix at 100° C., optionally varying speed |
| 2.0 min | discharge and form milled sheet on laboratory mixing roll mill for 20 s, then, over a further 40 s: cut and fold over 3* to the left, 3* to the right and roll 3* with a narrow roll gap (3 mm) and then draw off a milled sheet. (laboratory roll mill: diameter 250 mm, length 190 mm, roll gap 3-4 mm, flow temperature 80° C.) |

The general process for producing rubber mixtures and vulcanizates thereof is described in "Rubber Technology Handbook", W. Hofmann, Hanser Verlag 1994.

Vulcanization is effected at a temperature of 150° C. in a typical vulcanizing press with a holding pressure of 120 bar after $t_{95\%}$. The $t_{95\%}$ time was determined by moving disc rheometer (rotorless vulcameter) to DIN 53529/3 at 150° C.

The rubber testing is effected in accordance with the test methods specified in table 3.

Table 10 reports the rubber data for the vulcanizates.

used. The silane-modified polybutadiene according to the invention is employed as an additive in the inventive rubber mixture.

TABLE 13

| vulcanizate results: | ref. rubber mixture XV | inv. rubber mixture XVI, comprising inv. example 2F | inv. rubber mixture XVII, comprising inv. example 2G | inv. rubber mixture XIII, comprising inv. example 2H | inv. rubber mixture XIX, comprising inv. example 2I | inv. rubber mixture XX, comprising inv. example 2J | inv. rubber mixture XXI, comprising inv. example 3 |
|---|---|---|---|---|---|---|---|
| DIN abrasion abrasion/mm³ | 123 | 119 | 123 | 126 | 131 | 126 | 135 |
| ring tensile test at 60° C. 300% modulus/ MPa | 8.6 | 8.4 | 8.4 | 8.0 | 7.5 | 7.2 | 8.0 |
| Shore A hardness Shore A hardness/ SH | 63 | 60 | 60 | 59 | 59 | 58 | 57 |
| ball rebound rebound resilience at 60° C./% | 69.2 | 72.5 | 71.9 | 70.6 | 69.1 | 68.9 | 75.5 |
| viscoelastic properties, 60° C., Rubber Process Analyzer (RPA), strain sweep, 1.7 Hz, 0.28%-42% elongation maximum loss factor tan δ/— | 0.127 | 0.117 | 0.106 | 0.104 | 0.108 | 0.111 | 0.078 |
| viscoelastic properties at 60° C., 16 Hz, initial force 50 N, ampl. force 25 N loss factor tan δ/— | 0.080 | 0.065 | 0.061 | 0.066 | 0.068 | 0.068 | 0.055 |

The inventive rubber mixtures XVI to XXI show improved rolling resistance (lower tan δ values and higher rebound resiliences at 60° C.) compared to the reference rubber mixture XV.

When the degree of silane modification of the polybutadiene goes down the advantages compared to the reference rubber mixture XVI are not present (DIN abrasion, 300% modulus) or markedly less pronounced (tan δ and rebound resilience at 60° C.).

Rubber mixture XXI based on a polybutadiene which was produced by anionic polymerization and subsequently modified shows impaired rolling resistance compared to polybutadienes produced by free-radical polymerization (e.g. rubber mixtures XVI) and in some cases a lower hardness and a lower 300 modulus (higher DIN abrasion and lower Shore A hardness). These effects are amplified with an increasing degree of silanization (cf. ex. X-XIV).

Example 8: Rubber Mixtures V

The formulation used for the rubber mixtures is specified in table 11 below. In this table, the unit phr means parts by weight based on 100 parts by weight of the crude rubber

TABLE 14

| substance | amount [phr] ref. rubber mixture XXII | Amount [phr] inv. rubber mixture XXIII comprising inv. example 1 |
|---|---|---|
| 1st stage | | |
| NR SMR 10[a] | 80.0 | 80.0 |
| BR[b] | 20.0 | 20.0 |
| silica[c] | 55.0 | 55.0 |
| fatty acid[d] | 3.0 | 3.0 |
| ZnO[e] | 3.0 | 3.0 |
| 6PPD[f] | 1.0 | 1.0 |
| TMQ[g] | 1.0 | 1.0 |
| antiozonant wax[h] | 1.0 | 1.0 |
| Si 266[i] | 5 | 5 |
| example 1 | | 7.5 |
| 2nd stage | | |
| stage 1 batch | | |

TABLE 14-continued

| substance | amount [phr] ref. rubber mixture XXII | Amount [phr] inv. rubber mixture XXIII comprising inv. example 1 |
|---|---|---|
| 3rd stage stage 2 batch | | |
| DPG-80[j] | 2.5 | 2.5 |
| CBS[k] | 1.0 | 1.0 |
| sulphur[l] | 2.0 | 2.0 |

Substances used:
[a]NR TSR: SMR 10 from Nordmann, Rassmann GmbH (TSR = Technically Specified Rubber; SMR = Standard Malaysian Rubber).
[b]BR: hoch-cisPolybutadien Kautschuk CB 24, from Lanxess AG.
[c]silica: ULTRASIL ® 7000 GR from Evonik Industries AG.
[d]fatty acid: EDENOR ST1 GS fatty acid mixture, Caldic Deutschland Chemie B.V.
[e]ZnO: RS RAL 844 C ZnO from Arnsperger Chemikalien GmbH.
[f]6PPD: Vulkanox 4020/LG N-(1,3-dimethylbutyl)-N'-phenyl-p-phenylene diamine from Rhein Chemie Rheinau GmbH.
[g]TMQ: Vulkanox HS/LG polymerized 2,2,4-trimethyl-1,2-dihydroquinoline from Rhein Chemie Rheinau GmbH.
[h]antiozonant wax: Protektor G3108 from Paramelt B.V.
[i]Si 266 ®: bis(triethoxysilylpropyl)disulphide from Evonik Industries AG.
[j]DPG-80: Rhenogran ® DPG-80 mixture of 80% N,N'-diphenylguanidine and of 20% elastomeric carrier and dispersant from Rhein Chemie GmbH.
[k]CBS: CZ/EG-C N-cyclohexyl-2-benzothiazolesulphenamide from Rhein Chemie Rheinau GmbH.
[l]sulphur: Mahlschwefel 80/90° from Solvay & CPC Barium Strontium GmbH & Co. KG The mixtures are prepared in three stages in a 1.51 internal mixer (E-type) at a batch temperature of 150° C. in accordance with the mixing instructions in table 12.

TABLE 15

| stage 1 | |
|---|---|
| settings | |
| mixing unit | HF mixing group GmbH; type GK 1.5 E |
| fill level | 0.65 |
| speed | 70 rpm |
| ram pressure | 5.5 bar |
| flow temp. | 70° C. |
| Mixing process | |
| 0 to 0.5 min | SMR 10, BR CB 24 |
| 0.5 min | ½ ULTRASIL 7000 GR, Si 266, ZnO, fatty acid, inventive silane-modified polybutadiene (if present) |
| 0.5 to 1.0 min | mix |
| 1.0 min | vent and purge |
| 1.0 to 2.0 min | ½ ULTRASIL 7000 GR, antiozonant wax, 6PPD, TMQ |
| 2.0 to 3 min | mix at 150° C., optionally varying speed |
| 3 min | vent |
| 3 to 5 min | mix at 150° C., optionally varying speed |
| 5 min | discharge and form milled sheet on laboratory mixing roll mill for 45 s (laboratory roll mill: diameter 250 mm, length 190 mm, roll gap 4 mm, flow temperature 60° C.) |
| 24 h storage at room temperature stage 2 | |
| settings | |
| mixing unit | as in stage 1 except |
| fill level | 0.62 |
| mixing operation | |
| 0 to 1 min | break up stage 1 batch |
| 1 to 3 min | mix at 150° C., optionally varying speed |
| 3 min | discharge and form milled sheet on laboratory mixing roll mill for 45 s (laboratory roll mill: diameter 250 mm, length 190 mm, roll gap 4 mm, flow temperature 60° C.) |

TABLE 15-continued

| 24 h storage at room temperature stage 3 | |
|---|---|
| settings | |
| mixing unit | as in stage 1 except |
| fill level | 0.59 |
| speed | 50 rpm |
| flow temp. | 50° C. |
| mixing operation | |
| 0 to 2 min | break up stage 2 batch, accelerant and sulphur, mix at 100° C., optionally varying speed |
| 2 min | discharge and form milled sheet on laboratory mixing roll mill for 20 s, then, over a further 40 s: cut and fold over 3* to the left, 3* to the right and roll 3* with a narrow roll gap (3 mm) and then draw off a milled sheet. (laboratory roll mill: diameter 250 mm, length 190 mm, roll gap 3-4 mm, flow temperature 80° C.) |

The general process for producing rubber mixtures and vulcanizates thereof is described in "Rubber Technology Handbook", W. Hofmann, Hanser Verlag 1994.

Vulcanization is effected at a temperature of 150° C. in a typical vulcanizing press with a holding pressure of 120 bar after $t_{95\%}$. The $t_{95}$% time was determined by moving disc rheometer (rotorless vulcameter) to DIN 53529/3 at 150° C.

The rubber testing is effected in accordance with the test methods specified in table 3.

Table 13 reports the rubber data for the vulcanizates.

TABLE 16

| vulcanizate results: | ref. rubber mixture XXII | inv. rubber mixture XXIII comprising inv. example 1 |
|---|---|---|
| DIN abrasion abrasion/mm[3)] | 113 | 105 |
| ring tensile test at 23° C. 300% modulus/MPa | 8.7 | 11.3 |
| Shore A hardness | 63 | 65 |
| Shore A hardness/SH ball rebound rebound resilience at 60° C./% | 72.1 | 76.0 |
| viscoelastic properties, 60° C., Rubber Process Analyzer (RPA), strain sweep, 1.7 Hz, 0.28%-42% elongation maximum loss factor tan δ/— | 0.148 | 0.108 |
| viscoelastic properties at 60° C., 16 Hz, initial force 50 N, ampl. force 25 N loss factor tan δ/— | 0.064 | 0.047 |

The inventive rubber mixture XXIII shows improved rolling resistance (lower tan δ values and higher rebound resiliences at 60° C.) compared to the reference rubber mixture XXII. Addition of inventive silane-modified polybutadiene further achieves improved reinforcing characteristics (300% modulus) and lower abrasion (DIN abrasion).

Rubber Mixture Summary

It has been shown that addition of silane-modified polybutadienes to the typical rubber formulations known to those skilled in the art can markedly improve the core properties of tires, in particular abrasion and rolling resistance. This applies both to natural-rubber-based tires (examples 4-7) and to those based on a mixture of natural rubber and butyl rubber (example 8). This applies in particular to silane-modified polybutadienes based on free-radically-based polybutadienes as is shown inter alia by comparison of the DIN abrasion, 300 modulus and Shore A hardness for the rubber mixtures X and XXI. The polybutadienes produced by free-radical polymerization further show a markedly lower viscosity which facilitates both handling and processability.

The invention claimed is:

1. A rubber comprising silane-modified polybutadiene, wherein the polybutadiene comprises the 1,3-butadiene-derived monomer units

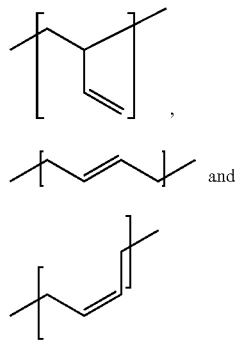

and wherein the proportion of A in the entirety of the 1,3-butadiene-derived monomer units present in the polybutadiene is from 10 to 60 mol %, and wherein the sum of the proportions of B and C in the entirety of the 1,3-butadiene-derived monomer units present in the polybutadiene is from 40 to 90 mol % wherein the silane-modified polybutadienes are obtainable by reacting hydroxyl-terminated polybutadienes produced by free-radical polymerization with one or more organosilane compounds, wherein the silane-modified polybutadiene has an average functionality of from 0.1 to 4.

2. The rubber according to claim 1, wherein the proportion of A) in the entirety of the 1,3-butadiene-derived monomer units present in the polybutadiene is from 15 to 30 mol %, the proportion of B) in the entirety of the 1,3-butadiene-derived monomer units present in the polybutadiene is from 50 to 70 mol % and the proportion of C) in the entirety of the 1,3-butadiene-derived monomer units present in the polybutadiene is from 15 to 30 mol, wherein the silane-modified polybutadiene has an average functionality of from 0.7 to 2.6.

3. The rubber according to claim 1, wherein the organosilane compound is selected from the group comprising compounds of formula I $$OCN-R-Si(OR^1)_x(R^2)_{3-x} \quad I$$

where R represents linear or branched alkylene chains having 1-4 carbon atoms and $R^1$ and $R^2$ simultaneously or independently of one another represent linear or branched alkyl chains having from 1 to 5 carbon atoms x=1, 2 or 3, wherein the silane-modified polybutadiene has an average functionality of from 1.2 to 2.5.

4. A rubber mixture comprising silane-modified polybutadienes, wherein the polybutadiene comprises the 1,3-butadiene-derived monomer units

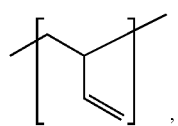

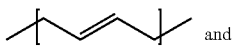

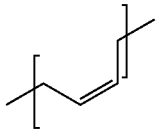

and wherein the proportion of A in the entirety of the 1,3-butadiene-derived monomer units present in the polybutadiene is from 10 to 60 mol %, and wherein the sum of the proportions of B and C in the entirety of the 1,3-butadiene-derived monomer units present in the polybutadiene is from 40 to 90 mol % wherein the silane-modified polybutadienes are obtainable by reacting hydroxyl-terminated polybutadienes produced by free-radical polymerization with one or more organosilane compounds, wherein the silane-modified polybutadiene has an average functionality of from 0.1 to 4.

5. The rubber mixture according to claim 4, wherein the silane-modified polybutadiene is employed in an amount of from 0.5 to 25 parts by wt based on 100 parts by wt of rubber, wherein the silane-modified polybutadiene has an average functionality of from 0.7 to 2.6.

6. The rubber mixture according to claim 4, wherein said mixture comprise 10 to 150 parts by wt of precipitated silica, 0 to 100 parts by wt of carbon black and 0.5 to 15 parts by wt of silane-modified polybutadiene according to claim 1, in each case based on 100 parts by weight of rubber %, wherein the silane-modified polybutadiene has an average functionality of from 1.2 to 2.5.

7. The rubber mixture according to claim 4, wherein said mixture comprise an organosilane and wherein the silane-modified polybutadiene has a viscosity of from 8.2 to 27.8 Pa*sec at 20° C.

8. The rubber mixture according to claim 7, wherein said mixture comprise 0.5 to 20 parts by wt of organosilane based on 100 parts by wt of rubber.

9. The rubber mixture according to claim 7, wherein said mixture comprise natural rubber or mixtures of natural rubber and diene rubber, 10 to 150 parts by wt of precipitated silica, 0 to 100 parts by wt of carbon black, 0.5 to 20 parts by wt of organosilane and 0.5 to 25 parts by wt of the silane-modified polybutadiene, in each case based on 100 parts by weight of rubber.

10. A product comprising the rubber mixture according to claim 4 wherein the product is selected from the group consisting of tires, profiles, cable sheaths, hoses, drive belts, conveyor belts, tire treads, shoe soles, sealing rings and damping elements.

11. A process of making a silane-modified polybutadiene, the process comprising the steps of
a) providing a polybutadiene produced by free-radical polymerization and having hydroxyl groups, and
b) reacting the polybutadiene having hydroxyl groups from step a) with an organosilane compound, wherein the polybutadiene comprises the 1,3-butadiene-derived monomer units

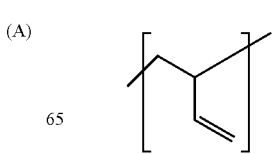

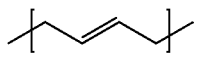 and (B)

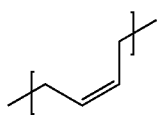 (C)

and wherein the proportion of A in the entirety of the 1,3-butadiene-derived monomer units present in the polybutadiene is from 10 to 60 mol %, and wherein the sum of the proportions of B and C in the entirety of the 1,3-butadiene-derived monomer units present in the polybutadiene is from 40 to 90 mol % wherein the silane-modified polybutadienes are obtainable by reacting hydroxyl-terminated polybutadienes produced by free-radical polymerization with one or more organosilane compounds, wherein the silane-modified polybutadiene has an average functionality of from 0.1 to 4.

12. The process of claim 11 wherein the silane-modified polybutadienes are obtainable by reacting hydroxyl-terminated polybutadienes produced by free-radical polymerization with one or more organosilane compounds and wherein the silane-modified polybutadiene has a viscosity of from 8.2 to 27.8 Pa*sec at 20° C.

13. The process of claim 11 wherein the proportion of A) in the entirety of the 1,3-butadiene-derived monomer units present in the polybutadiene is from 15 to 30 mol %, the proportion of B) in the entirety of the 1,3-butadiene-derived monomer units present in the polybutadiene is from 50 to 70 mol % and the proportion of C) in the entirety of the 1,3-butadiene-derived monomer units present in the polybutadiene is from 15 to 30 mol %.

14. The process of claim 11 wherein the organosilane compound is selected from the group comprising compounds of formula I

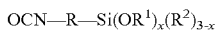

where R represents linear or branched alkylene chains having 1-4 carbon atoms and $R^1$ and $R^2$ simultaneously or independently of one another represent linear or branched alkyl chains having from 1 to 5 carbon atoms x=1, 2 or 3.

15. The rubber according to claim 3, wherein the proportion of A) in the entirety of the 1,3-butadiene-derived monomer units present in the polybutadiene is from 15 to 30 mol %, the proportion of B) in the entirety of the 1,3-butadiene-derived monomer units present in the polybutadiene is from 50 to 70 mol % and the proportion of C) in the entirety of the 1,3-butadiene-derived monomer units present in the polybutadiene is from 15 to 30 mol %.

16. The rubber according to claim 2, wherein the organosilane compound is selected from the group comprising compounds of formula I

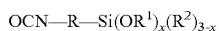

where R represents linear or branched alkylene chains having 1-4 carbon atoms and $R^1$ and $R^2$ simultaneously or independently of one another represent linear or branched alkyl chains having from 1 to 5 carbon atoms x=1, 2 or 3.

17. The rubber mixture according to claim 5, wherein said mixtures comprise an organosilane and wherein the silane-modified polybutadiene has a viscosity of from 8.2 to 27.8 Pa*sec at 20° C.

18. The rubber mixture according to claim 17, wherein said mixtures comprise 0.5 to 20 parts by wt of organosilane based on 100 parts by wt of rubber and wherein the silane-modified polybutadiene has a viscosity of from 8.2 to 27.8 Pa*sec at 20° C.

19. The rubber mixture according to claim 17, wherein said mixtures comprise natural rubber or mixtures of natural rubber and diene rubber, 10 to 150 parts by wt of precipitated silica, 0 to 100 parts by wt of carbon black, 0.5 to 20 parts by wt of organosilane and 0.5 to 25 parts by wt of the silane-modified polybutadiene, in each case based on 100 parts by weight of rubber.

20. The rubber according to claim 1, wherein the silane-modified polybutadiene has a viscosity of from 8.2 to 27.8 Pa*sec at 20° C.

* * * * *